United States Patent [19]
Moriya

[11] Patent Number: 5,299,911
[45] Date of Patent: Apr. 5, 1994

[54] ELECTRIC PITCH CONTROL APPARATUS FOR VARIABLE-PITCH PROPELLER

[75] Inventor: Yoshihito Moriya, Nagoya, Japan

[73] Assignee: Toyota Jidosha Kabushiki Kaisha, Aichi, Japan

[21] Appl. No.: 919,652

[22] Filed: Jul. 24, 1992

[30] Foreign Application Priority Data

Jul. 25, 1991 [JP] Japan .................. 3-208654

[51] Int. Cl.⁵ ........................... B64C 11/30
[52] U.S. Cl. ........................... 416/35; 416/36; 416/38; 416/44
[58] Field of Search ............ 416/25, 27, 28, 30, 416/35, 36, 38, 42, 44; 364/431.01

[56] References Cited

U.S. PATENT DOCUMENTS

| | | |
|---|---|---|
| 2,619,183 | 11/1952 | Chillson et al. . |
| 2,640,550 | 6/1953 | Knapp et al. . |
| 2,667,228 | 1/1954 | Wood et al. . |
| 3,589,830 | 6/1971 | Mogren et al. . |
| 4,772,179 | 9/1988 | Bennett et al. .......... 416/25 |
| 4,958,289 | 9/1990 | Sum et al. . |
| 5,019,006 | 5/1991 | Schneider et al. .......... 416/35 |
| 5,029,091 | 7/1991 | Schneider et al. . |
| 5,061,212 | 10/1991 | Morgenthaler et al. . |
| 5,209,640 | 5/1993 | Moriya . |

FOREIGN PATENT DOCUMENTS

| | | |
|---|---|---|
| 0311277 | 4/1989 | European Pat. Off. . |
| 0322343 | 6/1989 | European Pat. Off. . |
| 52-75792 | 6/1977 | Japan . |
| 60-76499 | 4/1985 | Japan . |

OTHER PUBLICATIONS

U.S. Ser. No. 07/626,741, Nakawaki et al, Dec. 13, 1990.

Primary Examiner—Edward K. Look
Assistant Examiner—James A. Larson
Attorney, Agent, or Firm—Kenyon & Kenyon

[57] ABSTRACT

An electric pitch control apparatus for a variable-pitch propeller equipped with a pitch control mechanism having an electrically controlled actuator for controlling a pitch angle of the propeller blade in accordance with a control current applied thereto. The electric pitch control apparatus is designed to compensate a difference between target and actual pitch control amounts caused by a secular change of the pitch control mechanism thereby to effect an accurate control of the propeller pitch.

5 Claims, 7 Drawing Sheets

ELECTRIC PITCH CONTROL APPARATUS FOR VARIABLE-PITCH PROPELLER

BACKGROUND OF THE INVENTION

1. Field of the Invention

The present invention relates to a propeller system for installation in aircrafts, and more particularly to an electric pitch control apparatus for a variable-pitch propeller.

2. Description of the Prior Art

Disclosed in Japanese Patent Laid-open Publication No. 60-76499 is a pitch control apparatus for a variable-pitch propeller which is designed to control a pitch angle of the propeller blade and a rotational number of the propeller in accordance with a mach number, an altitude, an atmospheric temperature and an output power of the prime engine in flight of the aircraft to thereby maximize the operation efficiency of the propeller. Practically, the pitch angle of the propeller blade is controlled by an electro-hydraulic control device which is arranged to control a supply amount of operation fluid in accordance with a difference between a target rotational number and an actual rotation number of the prime engine.

In such a conventional pitch control apparatus, a control value of the propeller pitch is properly determined such that the actual rotational number is adjusted to coincide with the target rotational number. In the case that the electro-hydraulic control device was used for a long period of time, however, there will occur a difference between the target pitch control amount and the actual pitch control amount due to a secular change of the control device. Even if the electro-hydraulic control device was operated without any secular change, the difference between the target and actual pitch control amounts will occur if the flow amount of operation fluid changes due to fluctuation of the fluid temperature. For these reasons, an accurate control of the propeller pitch may not be effected.

SUMMARY OF THE INVENTION

It is, therefore, a primary object of the present invention to provide an electric pitch control apparatus for a variable-pitch propeller which is designed to compensate for a difference between the target and actual pitch control amounts caused by a secular change of the electro-hydraulic control device thereby to effect an accurate control of the propeller pitch.

According to the present invention, the object is accomplished by providing an electric pitch control apparatus for a variable-pitch propeller of an aircraft equipped with a pitch control mechanism having an electrically controlled actuator for controlling a pitch angle of the propeller blade in accordance with a control current applied thereto, which comprises an engine rotation sensor for detecting an actual rotational number of a prime engine of the aircraft, a throttle sensor for detecting an opening degree of a throttle of the prime engine, first means for determining a target rotational number of the prime engine in relation to the opening degree of the engine throttle, second means for calculating a difference between the target and actual rotational numbers of the prime engine, third means for determining a standard control value in relation to the calculated difference in rotational number, and fourth means for producing a control current defined by the standard control value and for applying the control current to the pitch control mechanism so that the pitch angle of the propeller blade is varied by operation of the actuator so that the actual rotational number of the prime engine coincides with the target rotational number. The electric pitch control apparatus further comprises means for determining a flight condition of the aircraft, and means for correcting the standard control value in accordance with the calculated difference in rotational number when the aircraft has been in a constant flight condition for a predetermined period of time.

BRIEF DESCRIPTION OF THE DRAWINGS

Additional objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
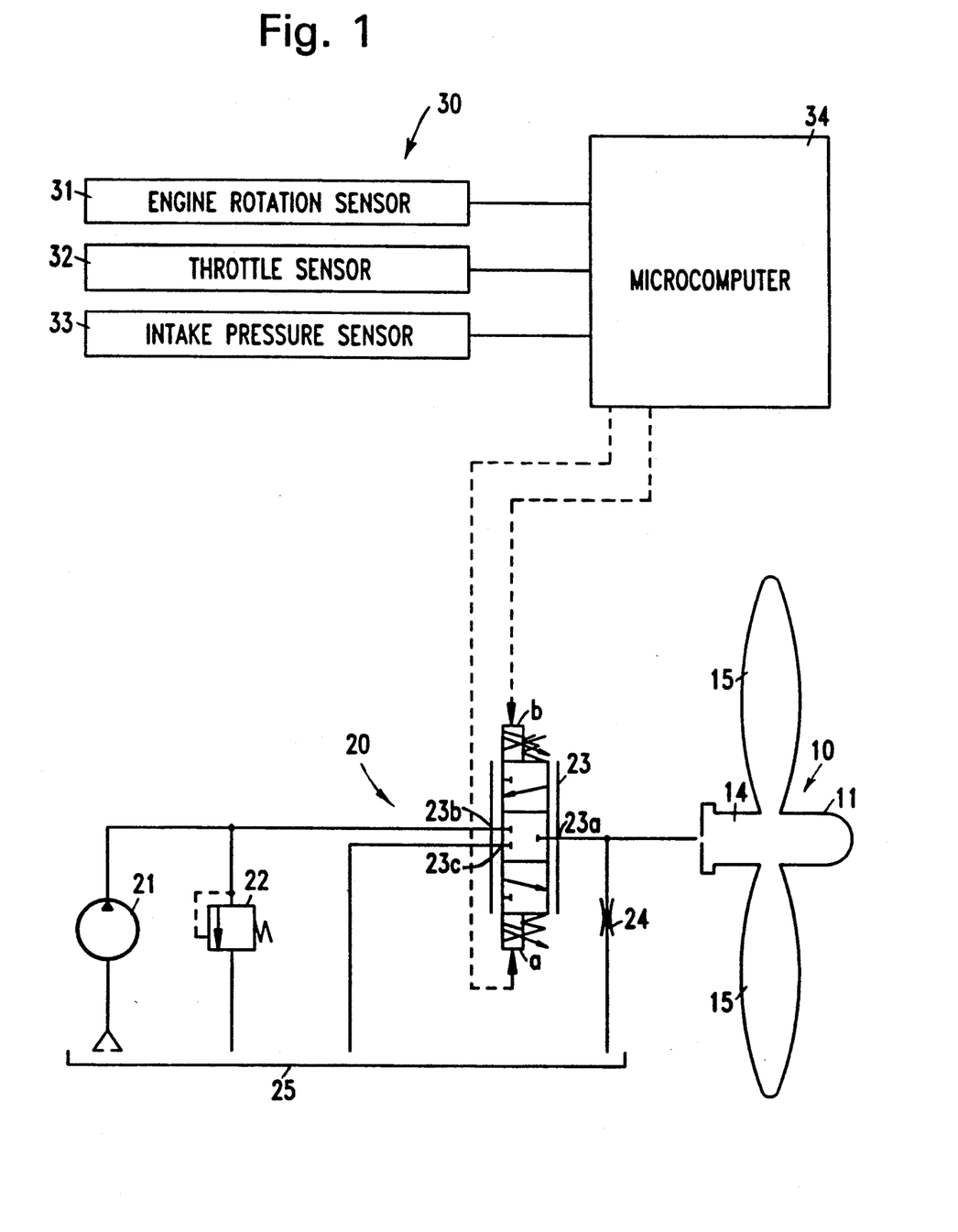
FIG. 1 is a circuit diagram of a hydraulic control system in combination with an electric pitch control apparatus according to the present invention.
Figure 2:
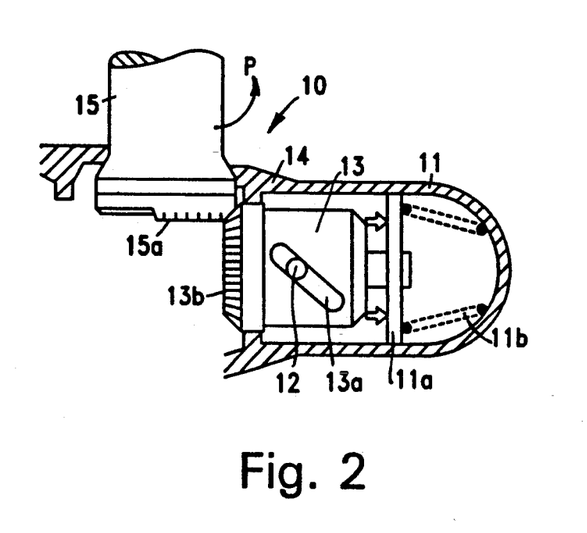
FIG. 2 is a sectional view of a pitch control mechanism of a propeller shown in FIG. 1.

In FIG. 1 of the drawings, there is schematically illustrated an electro-hydraulic pitch control system for a variable-pitch propeller which comprises a pitch control mechanism 10, a hydraulic control circuit 20 and an electric pitch control apparatus 30 according to the present invention. As shown in FIG. 2, the pitch control mechanism 10 includes a hydraulic cylinder 11 provided with a reciprocating piston 11a loaded by a return spring 11b, a follower pin 12 mounted on a rod portion of piston 11a for movement therewith, a hub member 13 rotatably mounted within a housing 14 integral with the hydraulic cylinder 11 and retained in place in an axial direction, the hub member 13 being formed with a cam slot 13a in engagement with the follower pin 12, a bevel gear 13b integrally provided on one end of hub member 13, and a bevel gear 15a rotatably mounted within the housing 14 and retained in place in an axial direction, the bevel gear 15a being integrally formed with a blade butt 15 of the propeller and meshed with the bevel gear 13b. Assuming that the hydraulic cylinder 11 has been applied with hydraulic fluid under pressure from the hydraulic control circuit 20, the piston 11a is moved rightward against the load of return spring 11b to rotate the blade butt 15 in a direction shown by an arrow P in FIG. 2. As a result, the pitch angle of the propeller blade is varied to be coarse pitch angle.

As shown in FIG. 1, the hydraulic control circuit 20 includes a fluid pump 21 arranged to be driven by a prime engine of the aircraft, a relief valve 22 arranged to define a maximum pressure of hydraulic fluid discharged from pump 21, an electromagnetic flow control valve 23, and a throttle 24. The electromagnetic flow control valve 23 is operated under control of the electric pitch control apparatus 30 to control the quantity of hydraulic fluid under pressure supplied into or discharged from the hydraulic cylinder 11. The flow control valve 23 is provided with solenoids a and b to be selectively energized by a control current applied thereto from the electric pitch control apparatus 30. The flow control valve 23 is designed to be retained in a neutral position during deenergization of its solenoids a and b. In a condition where the flow control valve 23 is retained in the neutral position, an outlet port 23a in connection to the hydraulic cylinder 11 is disconnected from inlet ports 23b and 23c respectively in connection to the delivery port of pump 21 and to a fluid reservoir 25. When the solenoid a is energized, the flow control valve 23 is displaced to provide a fluid connection between ports 23a and 23b for effecting the supply of hydraulic fluid under pressure into the hydraulic cylinder 11 from pump 21. When the solenoid b is energized, the flow control valve 23 is displaced to provide a fluid connection between ports 23a and 23c for discharging the hydraulic fluid from the hydraulic cylinder 11 into the fluid reservoir 25.

The throttle 24 is arranged to allow a small quantity of hydraulic fluid under pressure flowing therethrough into the fluid reservoir 25. If the electric pitch control apparatus 30 is damaged or the leading wires of solenoids a, b are disconnected in operation, the flow control valve 23 will be returned to and retained in the neutral position to disconnect the outlet port 23a from the inlet ports 23b and 23c. Thus, the pressure in hydraulic cylinder 11 is maintained to avoid a sudden change of the pitch angle of the propeller blade. In such a condition, the throttle 24 causes the hydraulic fluid from cylinder 11 to gradually discharge therethrough into the fluid reservoir 25. As a result, the piston 11a of cylinder 11 is moved leftward by the load of return spring 11b to vary the pitch angle of the propeller blade to a fine pitch angle for fail safe.

The electric pitch control apparatus 30 includes an engine rotation sensor 31 for detecting a rotational number $N_E$ of the prime engine of the aircraft, a throttle sensor 32 for detecting an opening degree of the engine throttle, a pressure sensor 33 for detecting an intake pressure of the prime engine, and a microcomputer 34 connected to the sensors 31-33. The microcomputer 34 has an interface arranged to be applied with detection signals from the sensors 31-33, a read-only memory or ROM arranged to store a control program shown by a flow chart in FIGS. 6-8 and maps necessary for processing the control program, a central processing unit or CPU for execution of the control program, and a random access memory or RAM arranged to temporarily memorize variables for execution of the control program.

Figure 3:
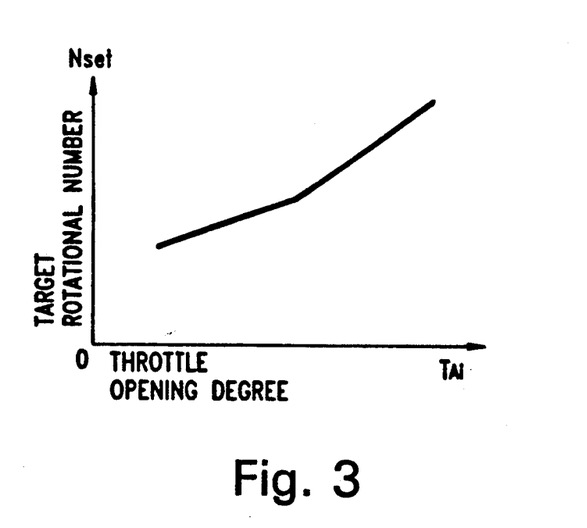
FIG. 3 is a map showing a target rotational number $N_{set}$ of a prime engine in relation to an opening degree $T_{Ai}$ of the engine throttle.
Figure 4:
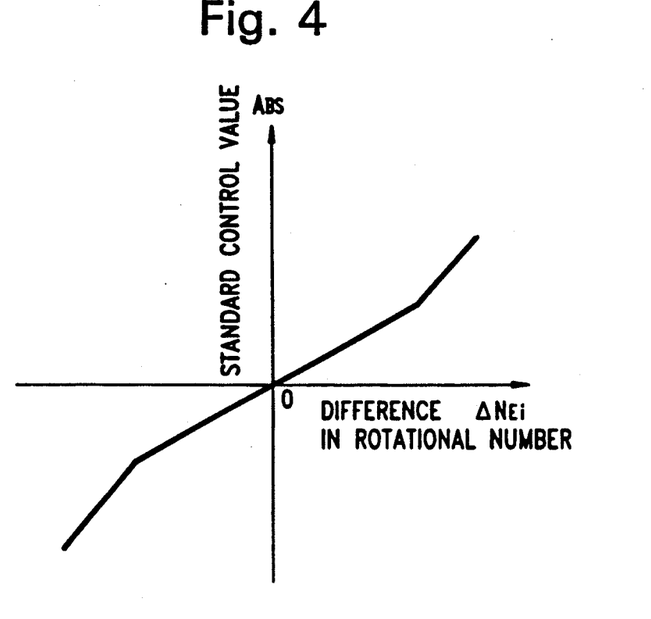
FIG. 4 is a map showing a standard control amount $A_{BS}$ in relation to a difference $N_{Ei}$ between the target rotational number $N_{set}$ and an actual rotational number $N_{Ei}$ of the prime engine.
Figure 5:
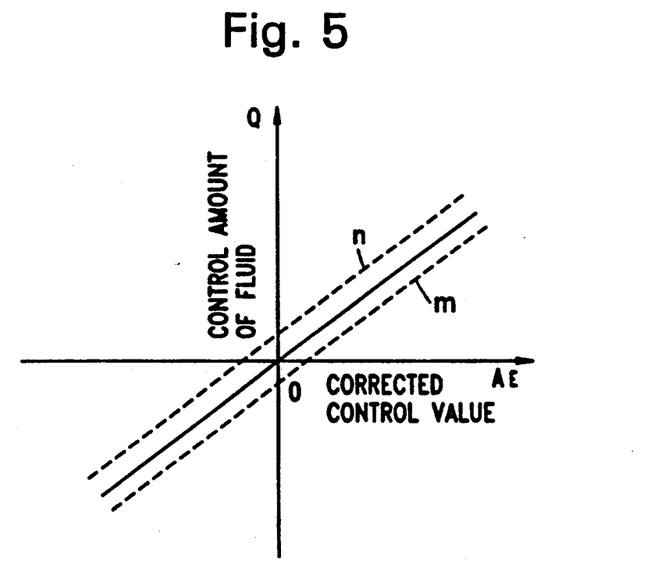
FIG. 5 is a map showing a relationship between a corrected control value $A_E$ and a control amount $Q$ of operation fluid.

The maps stored in the ROM are in the form of three kinds of two dimensional maps shown in FIGS. 3, 4 and 5, respectively representing a target rotational number $N_{set}$ of the prime engine in relation to an opening degree $T_{Ai}$ of the engine throttle, a standard control value $A_{BS}$ in relation to a difference $\Delta N_{Ei}$ between the target rotational number $N_{set}$ and an actual rotational number $N_{Ei}$ of the prime engine, and a control amount Q of hydraulic fluid in relation to a corrected control value $A_E$. The target rotational number $N_{set}$ is defined to be approximately proportional to the opening degree $T_{Ai}$ of the engine throttle, and the standard control value $A_{BS}$ is defined to be approximately proportional to the difference $\Delta N_{Ei}$ in rotational number for controlling a supply amount of electric current to the flow control valve 23 on a basis of the difference $\Delta N_{Ei}$ in rotational number. When the standard control value $A_{BS}$ is positive, the flow control valve 23 is energized by a control current applied to its solenoid b to discharge an amount of hydraulic fluid from the hydraulic cylinder 11. When the standard control value $A_{BS}$ is negative, the flow control valve 23 is energized by a control current applied to its solenoid a to supply an amount of hydraulic fluid to the hydraulic cylinder 11. The corrected control value $A_E$ is obtained by addition of a correction coefficient kG to the standard control value $A_{BS}$, and the control amount Q of hydraulic fluid is defined to be proportional to the corrected control value $A_E$. In addition, each of the control values $A_{BS}$, $A_E$ and correction coefficient kG is a digital value which is increased or decreased by "1" as a minimum unit. The maps are theoretically determined in consideration with the characteristics of the prime engine and the variable pitch propeller.

Figure 6:
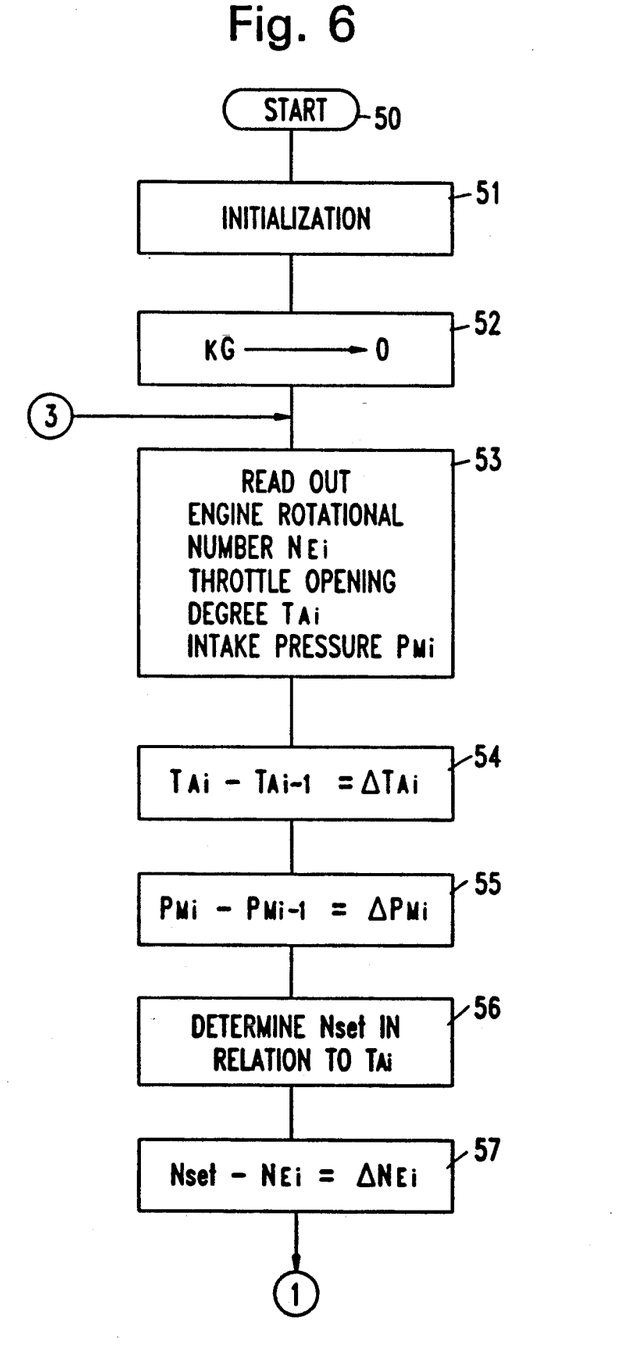
FIG. 6 is a first part of a flow chart of a control program to be executed by a microcomputer shown in FIG. 1.
Figure 7:
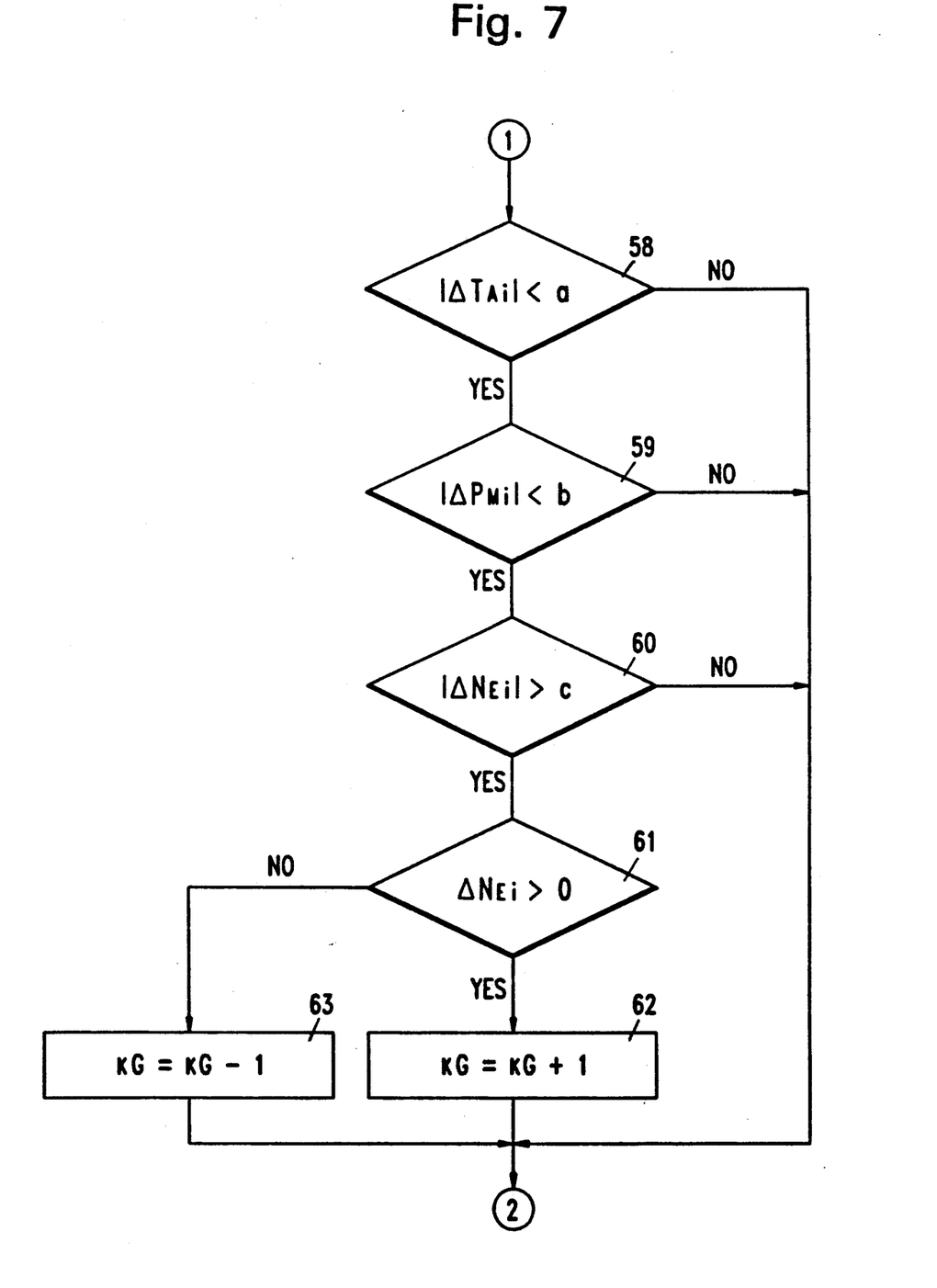
FIG. 7 is a second part of the flow chart.
Figure 8:
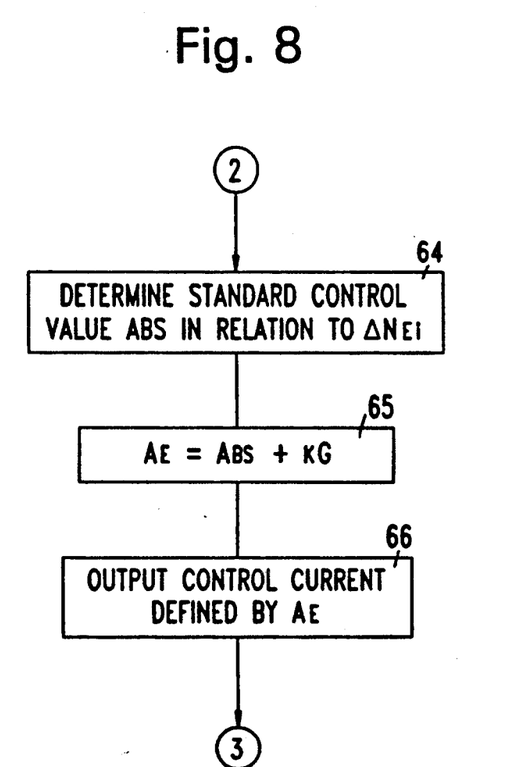
FIG. 8 is a third part of the flow chart.

Hereinafter, the operation of the electric pitch control apparatus 30 will be described in detail with reference to the flow charts shown in FIGS. 6 to 8. Assuming that the prime engine of the aircraft has been started, the computer 34 is activated to initiate execution of the control program at step 50 shown in FIG. 6. At step 51, the CPU of computer 34 initializes variables for execution of the control program and sets the correction coefficient kG as "0" at step 52. At the following step 53, the CPU of computer 34 is applied with detection signals from the sensors 31-33 through the interface to read out an actual rotational number $N_{Ei}$ of the prime engine, an opening degree $T_{Ai}$ of the engine throttle and an intake pressure $P_{Mi}$ of the prime engine and to temporarily store the data in the RAM of computer 34. When the program proceeds to step 54, the CPU of computer 34 calculates a difference $\Delta T_{Ai}$ between instant and prior opening degrees $T_{Ai}$ and $T_{Ai-1}$ of the engine throttle detected at a predetermined time interval $\Delta t$ and calculates at step 55 a difference $\Delta P_{Mi}$ between instant and prior intake pressures $P_{Mi}$ and $P_{Mi-1}$ detected at the predetermined time interval $\Delta t$. At the following step 56, the CPU of computer 34 determines a target rotational number $N_{set}$ in relation to the instant opening degree $T_{Ai}$ of the engine throttle on a basis of the map shown in FIG. 3 and calculates at step 57 a difference $\Delta N_{Ei}$ between the target rotational number $N_{set}$ and an actual rotational number $N_{Ei}$ of the prime engine.

Subsequently, a flight condition of the aircraft is determined as follows. At step 58 of the program shown in FIG. 7, the CPU of computer 34 determines whether an absolute value $|T_{Ai}|$ of the difference $\Delta T_{Ai}$ in throttle opening degree is larger than a constant a defined by the characteristic of the prime engine. In the case where the value of $|\Delta T_{Ai}|$ is greater than a, the aircraft is not in a constant flight condition, and the CPU of computer 34 determines a "No" answer at step 58 and causes the program to proceed to step 64 for processing at the following step 65, 66. In the case where the value of $|\Delta T_{Ai}|$ is less than a, the aircraft is in a constant flight condition, and the CPU of computer 34 determines a "Yes" answer at step 58 and causes the program to proceed to step 59 for determining whether an absolute value $|\Delta P_{Mi}|$ of the difference $\Delta P_{Mi}$ in intake pressure is larger than a constant b defined by the characteristic of the prime engine. In the case where the value of $\Delta P_{Mi}$ is greater than b, the aircraft is not in a constant flight condition, and the CPU of computer 34 determines a "No" answer at step 59 and causes the program to proceed to step 64 for processing at the following step 65, 66. In the case where the value of $\Delta P_{Mi}$ is less than b, the aircraft is in a constant flight condition, and the CPU of computer 34 determines a "Yes" answer at step 59 and causes the program to proceed to step 60.

When the program proceeds to step 64, the CPU of computer 34 determines a standard control value $A_{BS}$ in relation to the calculated difference $\Delta N_{Ei}$ in rotational number on a basis of the map shown in FIG. 4 and adds at step 65 a correction coefficient kG to the standard control value $A_{BS}$ to obtain a corrected control value $A_E$. At this stage, the correction coefficient kG is maintained as "0" since the aircraft is not in a constant flight condition. At the following step 66, the CPU of computer 34 produces a control current defined by the corrected control value $A_E$ and applies it to the solenoid a or b of flow control valve 23. When the corrected control value $A_E$ is positive, the solenoid b of flow control valve 23 is energized by the control current applied from the CPU of computer 34 to discharge an amount Q of hydraulic fluid defined by the corrected control value $A_E$ from the hydraulic cylinder 11 so that the pitch angle of propeller blade 15 is decreased to increase the rotational number $N_{Ei}$ of the prime engine to cause it to coincide with the target rotational number $N_{set}$. When the corrected control value $A_E$ is negative, the solenoid a of flow control valve 23 is energized by the control current applied from the CPU of computer 34 to supply an amount Q of hydraulic fluid defined by the corrected control value $A_E$ into the hydraulic cylinder 11 so that the pitch angle of propeller blade 15 is increased to decrease the rotational number $N_{Ei}$ of the prime engine to cause it to coincide with the target rotational number $N_{set}$. Subsequently, the CPU of computer 34 causes the program to return to step 53 for processing at step 53-66.

When it has been determined that the aircraft is in a constant flight condition, the CPU of computer 34 determines a "Yes" answer respectively at step 58 and 59 and causes the program to proceed to step 60. At step 60, the CPU of computer 34 determines whether the absolute value $|\Delta N_{Ei}|$ of the difference $\Delta N_{Ei}$ in rotational number is larger than a constant c defined by the characteristic of the prime engine. When the absolute value $|\Delta N_{Ei}|$ is smaller than the constant c, the actual rotational number $N_{Ei}$ of the prime engine tends to approach the target rotational number $N_{set}$. This means that the pitch control mechanism 10 and the hydraulic control circuit 20 are normally operated or that a deviation from a proper pitch control value caused by a secular change of the pitch control mechanism has been corrected. When the absolute value $|\Delta N_{Ei}|$ of the difference in rotational number is larger than the constant c, the rotational number $N_{Ei}$ of the prime engine does not approach the target rotational number $N_{set}$. This means that the pitch angle control of propeller blade 15 is deviated from the proper pitch control value due to a secular change of the pitch control mechanism. If there is some trouble caused by a secular change of the pitch control mechanism, the CPU of computer 34 determines a "Yes" answer at step 60 and causes the program to proceed to step 61.

At step 61, the CPU of computer 34 determines whether the difference $\Delta N_{Ei}$ in rotational number is positive or negative. If the difference $\Delta N_{Ei}$ in rotational number is positive, the control amount Q of hydraulic fluid is defined in relation to the corrected control value $A_E$ as shown by a dotted line m in FIG. 5. This means that the discharge amount of hydraulic fluid from the hydraulic cylinder 11 becomes too small due to a secular change of the pitch control mechanism or that the supply amount of hydraulic fluid into the hydraulic cylinder 11 becomes too large due to the secular change of the pitch control mechanism. If the difference $\Delta N_{Ei}$ in rotational number is negative, the control amount Q of hydraulic fluid is defined in relation to the corrected control value AE as shown by a dotted line n in FIG. 5. This means that the discharge amount of hydraulic fluid from the hydraulic cylinder 11 becomes too large due to a secular change of the pitch control mechanism or that the supply amount of hydraulic fluid into the hydraulic cylinder 11 becomes too small due to the secular change. To correct such an abnormal control of hydraulic fluid, the CPU of computer 34 changes the correction coefficient kG at step 62 or 63. If the answer at step 61 is "Yes", the program proceeds to step 62 where the CPU of computer 34 increases the correction coefficient kG by "1". If the answer at step 61 is "No", the program proceeds to step 63 where the CPU of computer 34 decreases the correction coefficient kG by "1". After processing at step 62 or 63, the CPU of computer 34 causes the program to proceed to step 64.

When the program proceeds to step 64 after processing at step 62 or 63, the CPU of computer 34 determines a standard control value $A_{BS}$ in relation to the difference $\Delta N_{Ei}$ in rotational number on a basis of the map shown in FIG. 4 and adds the adjusted correction coefficient kG to the standard control value $A_{BS}$ at step 65 to obtain a corrected control value $A_E$. At the following step 66, the CPU of computer 34 produces a control current defined by the corrected control value $A_E$ and applies it to the solenoid a or b of the flow control valve 23 for control of the hydraulic fluid discharged from or supplied into the hydraulic cylinder 11. Subsequently, the CPU of computer 34 returns the program to step 53 for processing at step 53-66 during which the correction coefficient kG is adjusted to coincide the corrected control value $A_E$ with a proper control value for control of the pitch control mechanism.

When the pitch angle control of the propeller blade is normally conducted by proper adjustment of the correction coefficient kG, the absolute value $|\Delta N_{Ei}|$ of the difference $\Delta N_{Ei}$ in rotational number becomes smaller than the constant c. In this instance, the CPU of computer 34 determines a "No" answer at step 60 and causes the program to proceed to step 64. Subsequently, the CPU of computer 34 determines at step 64 a standard control value $A_{BS}$ in relation to the difference $\Delta N_{Ei}$ in rotational number and calculates at step 65 a corrected control value $A_E$ without any change of the correction coefficient kG. Thus, the CPU of computer 34 produces a control current defined the corrected control value $A_E$ and applies it to the solenoid a or b of the flow control valve 23 for control of the hydraulic fluid discharged from or supplied into the hydraulic cylinder 11. As a result, the pitch angle of the propeller blade is controlled to an optimum angle for coinciding the actual rotational number of the prime engine with the target rotational number $N_{set}$.

From the above description, it will be understood that when the aircraft is in a constant flight condition, a standard control value $A_{BS}$ is determined in relation to a difference $\Delta N_{Ei}$ in rotational number and is corrected by addition of a correction coefficient kG to obtain a corrected control value $A_E$. With such control based on the corrected control value $A_E$, a deviation of the pitch control value caused by a secular change of the pitch control mechanism can be compensated to effect a proper pitch angle control of the propeller blade.

Figure 9:
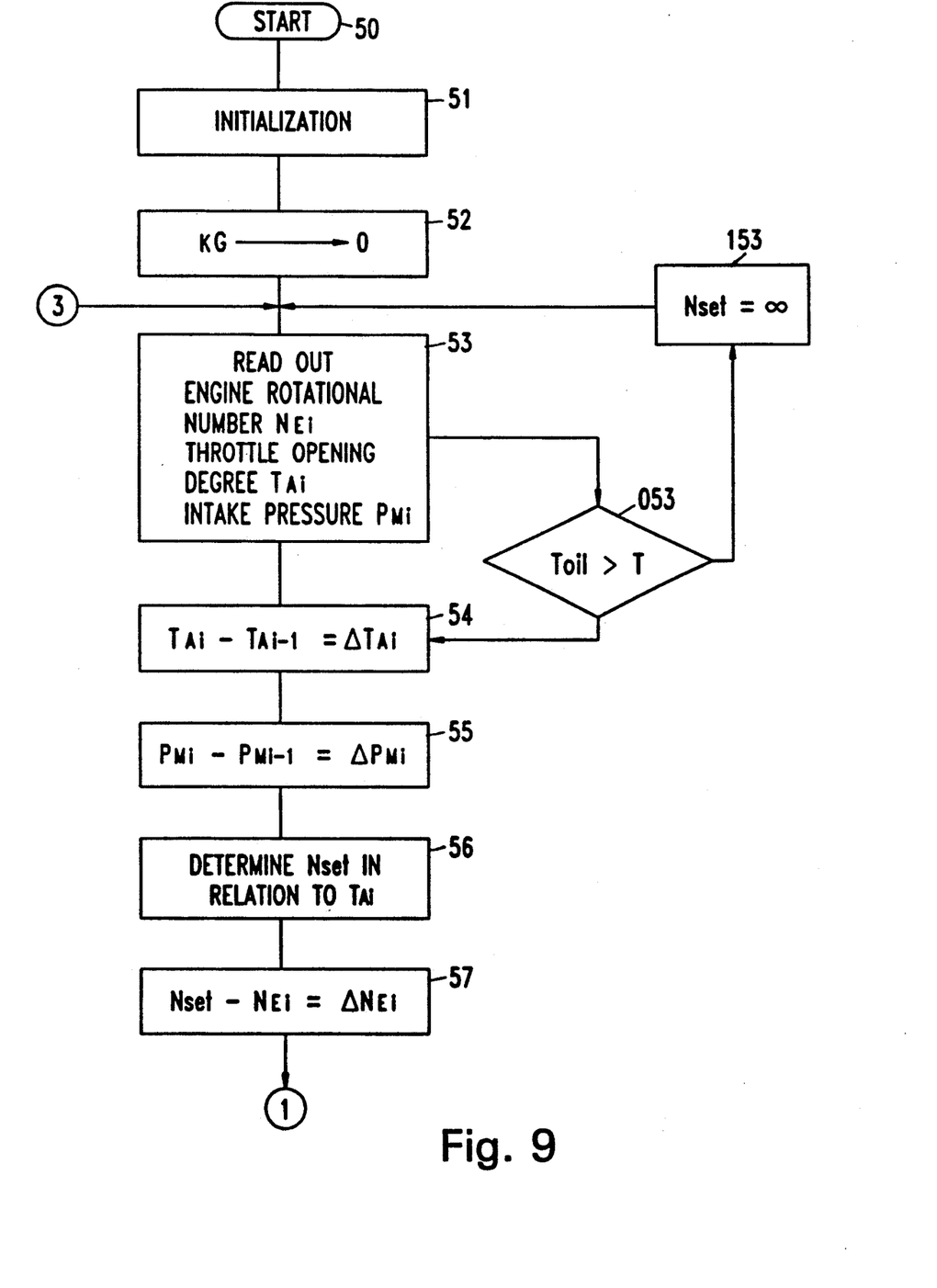
FIG. 9 is a flow chart of a modification of the control program.

In FIG. 9 there is illustrated a modification of the control program which is designed to execute processing at step 053 for determining a temperature of hydraulic fluid stored in the fluid reservoir 25 and processing at step 153 for setting the pitch angle of the propeller blade to a minimum angle $L_o$. To execute the processing at step 053, the computer 34 is further connected to a thermal sensor (not shown) arranged to detect a temperature $T_{oil}$ of hydraulic fluid stored in the fluid reservoir 25 for producing a detection signal indicative of the detected temperature $T_{oil}$.

Assuming that the computer 34 has been activated to initiate execution of the modified control program at step 50 shown in FIG. 9, the CPU of computer 34 initializes at step 51 variables for execution of the modified control program and sets the correction coefficient kG as "0" at step 52. At the following step 53, the CPU of computer 34 is applied with detection signals from the sensors 31-33 and the thermal sensor through the interface to read out an actual rotational number $N_{Ei}$ of the prime engine, an opening degree $T_{Ai}$ of the engine throttle, an intake pressure $P_{Mi}$ of the prime engine and a temperature $T_{oil}$ of hydraulic fluid and to temporarily store the data in the RAM. When the program proceeds to step 053, the CPU of computer 34 determines whether the detected temperature $T_{oil}$ of hydraulic fluid is higher than a predetermined temperature T (for instance, 60° C.). If the answer at step 053 is "No", the program proceeds to step 153 where the CPU of computer 34 sets a target rotational number $N_{set}$ as a maximum rotational number $N_{max}$ and issues a control current for setting the pitch angle of the propeller blade to a minimum angle Lo to apply it to the solenoid b of flow control valve 23. When applied with the control current from the CPU of computer 34, the solenoid b of flow control valve 23 is energized to discharge the hydraulic fluid from hydraulic cylinder 11 so that the pitch angle of the propeller blade is minimized to increase the rotational number $N_{Ei}$ of the prime engine for warming up.

When the prime engine is warmed up, the temperature of hydraulic fluid becomes higher than the predetermined temperature T. In this instance, the CPU of computer 34 determines a "Yes" answer at step 053 and causes the program to proceed to step 54 for calculating a difference $\Delta T_{Ai}$ between instant and prior opening degrees $T_{Ai}$ and $T_{Ai-1}$ of the engine throttle detected at the predetermined time interval $\Delta t$. Subsequently, the CPU of computer 34 executes the control program in the same manner as described above.

What is claimed is:

1. An electric pitch control apparatus for a variable pitch propeller of an aircraft equipped with a pitch control mechanism having an electrically controlled actuator for controlling a pitch angle of a blade of the propeller in accordance with a control current applied thereto, comprising:
   an engine rotation sensor for detecting an actual rotational number of a prime engine of the aircraft;
   a throttle sensor for detecting an opening degree of a throttle of the prime engine;
   first means for determining a target rotational number of the prime engine in relation to the opening degree of said throttle;
   second means for calculating a difference between the target and actual rotational numbers of the prime engine;
   third means for determining a standard control value in relation to the calculated difference between the target rotational number and the actual rotational number; and
   fourth means for controlling the control current based on the standard control value and for applying the control current to said pitch control mechanism so that the pitch angle of the propeller blade is varied by operation of said actuator to coincide the actual rotational number of the prime engine with the target rotational number;
wherein said electric control apparatus further comprises means for determining a flight condition of the aircraft, and means for correcting the standard control value in accordance with the calculated difference in rotational number when the aircraft has been in a constant flight condition for a predetermined time.

2. An electric pitch control apparatus as recited in claim 1, further comprising a hydraulic cylinder supplied with hydraulic fluid under pressure and a thermal sensor for detecting a temperature of the hydraulic fluid under pressure supplied to said hydraulic cylinder, means for determining whether the temperature of the hydraulic fluid under pressure is higher than a predetermined temperature, wherein the first means for determining a target rotational number operates to set the target rotational number to a maximum rotational number when the temperature of hydraulic fluid under pressure is lower than the predetermined temperature.

3. An electric pitch control apparatus as recited in claim 1, wherein said means for determining a flight condition of the aircraft comprises means for calculating a difference between instant and prior opening degrees of said throttle detected at a predetermined time interval, and means for determining whether the calculated difference in throttle opening degree is smaller than a predetermined constant.

4. An electric pitch control apparatus as recited in claim 3, further comprising a pressure sensor for detecting an intake pressure of the prime engine, wherein said means for determining a flight condition of the aircraft further comprises means for calculating a difference between instant and prior intake pressures of the prime engine detected at the predetermined time interval and means for determining whether the calculated difference in intake pressure is smaller than a predetermined constant.

5. An electric pitch control apparatus as recited in claim 1, wherein said means for correcting the standard control value comprises means for determining whether the calculated difference in rotational number is larger than a predetermined constant, means for adjusting a correction coefficient when the calculated difference in rotational number is larger than the predetermined constant, and means for correcting the standard control value by addition of the adjusted correction coefficient.

* * * * *